United States Patent Office 3,674,564
Patented July 4, 1972

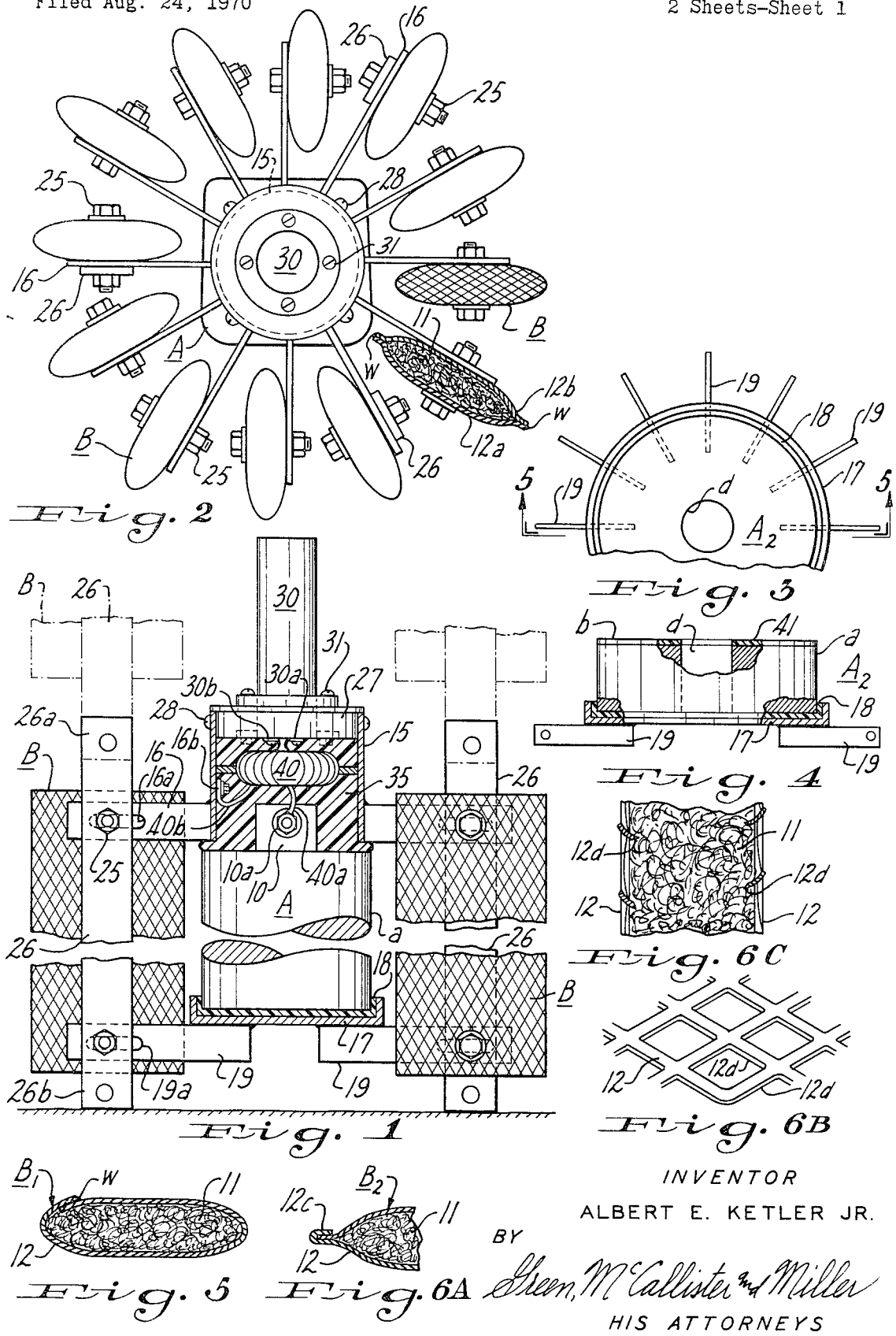

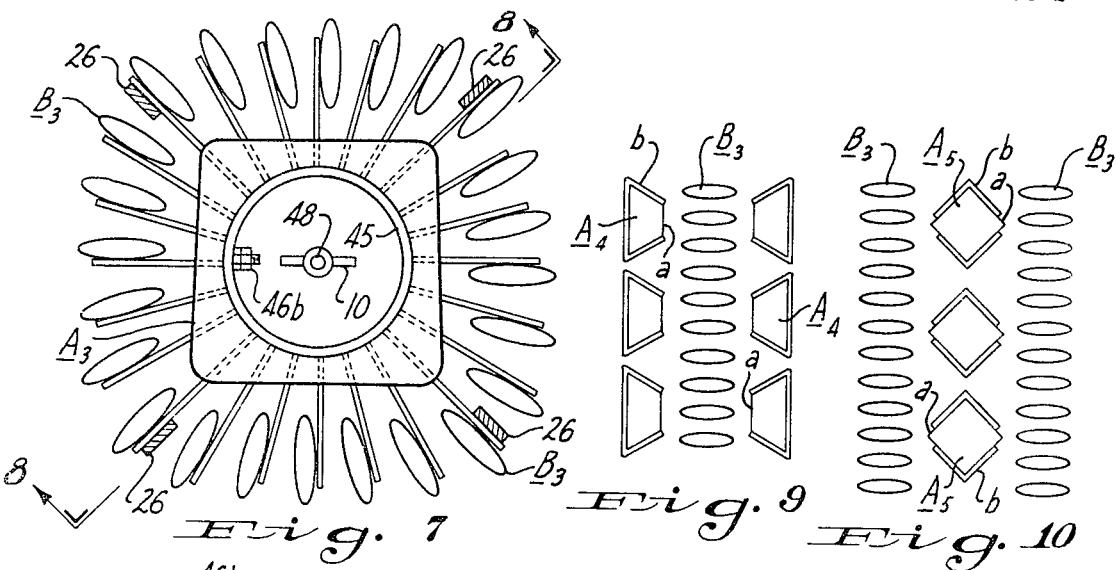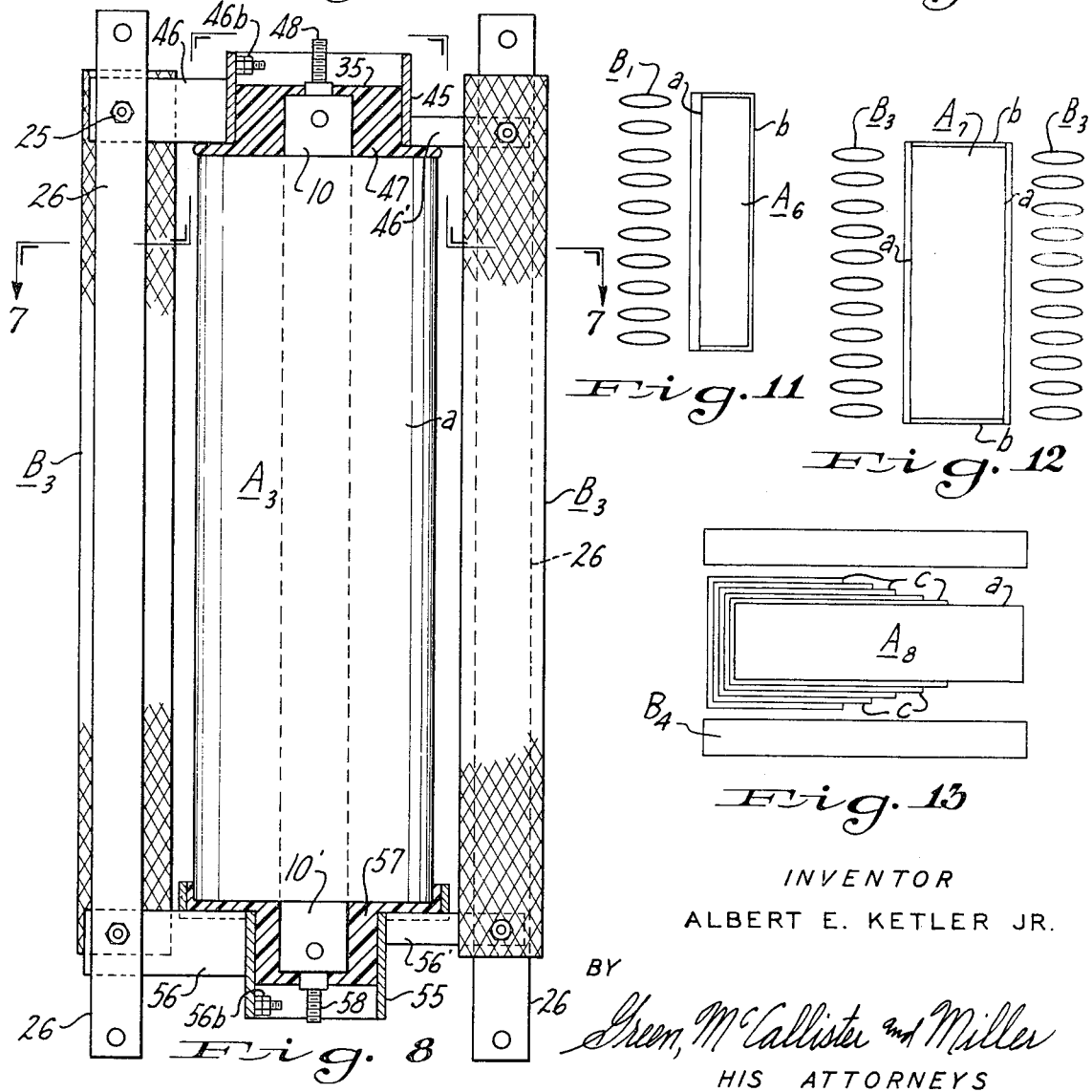
INVENTOR
ALBERT E. KETLER JR.

3,674,564
SEA WATER BATTERY WITH FIBER-LIKE
METAL CATHODE
Albert E. Ketler, Jr., 318 N. 6th St.,
Indiana, Pa. 15701
Filed Aug. 24, 1970, Ser. No. 66,422
Int. Cl. H01m 17/02
U.S. Cl. 136—100 R                    19 Claims

ABSTRACT OF THE DISCLOSURE

A galvanic battery or cell is disclosed for use in a salt water environment that constitutes the electrolyte for generation of electrical energy between cathode and anode electrodes of electro-reactive dissimilar metals, such as nickel, iron or steel and magnesium. The cathode is constructed of relatively coarse fiberlike metal such as steel wool or shavings, iron or steel scrap compactly-positioned as a core that is held in place by a perforated metal or grid enclosure of relatively flat or winglike shape. A group of such cathode electrode bodies is positioned in a spaced-apart relation with respect to each other and, as an optimum, in an endwise spaced relationship with respect to a solid metal anode electrode, such as of magnesium. Anode electrode means is shown having a portion of its metal surface area masked or covered by an insulating resin that may be progressively unmasked or exposed during the operating life of the battery.

---

This invention relates to a new and improved sea water galvanic battery or cell and particularly, to a battery that will have an improved operating relation and construction of its parts for sea water utilization. A phase of the invention relates to providing an improved electrode arrangement and construction in a sea water battery.

A sea water battery is a galvanic cell that generates electrical energy by virtue of the dissimilarity between the anode and cathode metals, as governed by their positioning in the electromotive series. The cell is to be immersed in a sea water-like environment which, with its sodium chloride salt content, serves as the electrolyte. When an external load is applied to the battery, an electric current flows and the anode material erodes away by chemical reaction with the sea water to form useful electrical energy. Hydrogen gas is evolved at the anode and soluble and insoluble reaction products are produced, including in the case of a magnesium anode, chalklike magnesium hydroxide. A magnesium anode and nickel, steel or iron wool cathode combination has now been found to be effective for sea water cell utilization, due to higher voltage capability and low polarization propensity, compared with a zinc and steel combination. The implementation of a practical sea water battery has not heretofore been sufficiently successful to provide a marketable device, due to low power output.

The expanding oceanographic industry has been searching for new power sources to operate the myriad of electric energy requiring systems being developed for undersea use. In this connection, cost, size, weight, operating life and power generated, are all factors that have to be considered. The desideratum is for a battery which will be effective in warm and cold, shallow and deep waters and in relatively active as well as relative stagnant bodies of salt water. Although it has been determined that a battery using a zinc anode has the advantage of a relatively long life, polarization makes it impractical in stagnant sea water. It was further determined that a magnesium anode is effective in cold as well as warm water areas and also in active as well as stagnant areas, but that a surrounding annular cathode of steel wool loosely packed into the form an annulous wasted nearly half of its power from the standpoint of high resistance losses in the fibers. Further, the wool fibers in this connection tend to act as a filter material, thus collecting sludge and other contaminants to, in a short time, cause severe power degradation due to clogging of the passageways for flow of the sea water electrolyte, and limit water circulation or flow into and out of the inside of the battery. Also, the construction was found to be impractical for efficient operation in an effective outward removing movement of reaction products such as magnesium hydroxide, and a washing, flushing supply and circulation of sea water electrolyte.

In view of the above considerations, it has been an object of the invention to meet the limiting or adverse factors heretofore involved in the construction and use of a galvanic sea water battery or cell and to provide a solution to the problem involved;

Another object of the invention has been to develop a practical sea water battery that is capable of commercial production and utilization;

Another object has been to devise a galvanic sea water battery that will meet the various factors involved in underwater utilization with regard to temperature, movement or lack of movement of the water, power production, efficiency, low cost, reliability, long life and wattage maintenance or stability over substantially its full operating life;

A further object of the invention has been to provide an improved cathode construction and utilization from the standpoint of minimizing internal power losses and maximizing free movement of water into and out of the battery;

A still further object of the invention has been to provide a battery in which the effective surface area of its anode material progressively increases over its operating life;

These and other objects of the invention will appear to those skilled in the art from the illustrated embodiments, the description and the claims.

In the drawings, FIG. 1 is a vertical sectional view in elevation of a galvanic cell or battery construction in accordance with the invention.

FIG. 2 is a top plan view on the scale of and of the construction of FIG. 1; one cathode electrode in this view has been sectioned to show details of a representative construction thereof; another cathode electrode has been illustrated as to its enclosing perforated metal plate or grid member construction.

FIG. 3 is a top plan view illustrating a modified form of anode with attached supporting wings or fingers for a group of cathodes such as illustrated in FIG. 2.

FIG. 4 is an elevation partially in section on the scale of and taken along the line 5—5 of FIG. 4.

FIG. 5 is a sligthly enlarged horizontal section of another form of cathode in which a one-piece enclosing metal member is utilized.

FIG. 6A is a fragmental horizontal section on the scale of FIG. 6 illustrating a further form of cathode construction utilizing one or two opposed metal enclosure members with adjacent ends being secured together by lapping of one edge over the other edge.

FIG. 6B is a further enlarged fragment showing a representative perforated or grid-like outer, enclosing metal member for a modified form of cathode electrode body.

FIG. 6C is an enlarged fragmental section showing use of the modified form of body of FIG. 6B with somewhat loosely packed but metallurgically bonded metal fibers.

FIG. 7 is a horizontal section of another form of cell constructed in accordance with the invention and taken along the line 7—7 of FIG. 8.

FIG. 8 is a vertical section on the scale of and taken along the line 8—8 of FIG. 7.

And, FIGS. 9, 10, 11, 12, and 13 are somewhat diagrammatic plan views illustrating further forms of the invention and masking arrangements for anode electrode means thereof.

In carrying out the invention, it was found to be preferable to utilize a nickel, steel or iron wool or shaving sandwich cathode body and solid or barlike magnesium anode means in combination. The cathode electrodes are of relatively flat, winglike or of pillow or ellipsoidal shape and are employed, mounted or suspended as a cooperating group of element assemblies or bodies that are not only suitably spaced with respect to the anode electrode or electrodes, but also have a spaced, aligned relation with each other along the anode means, all in such a manner as to enable a free circulation of the sea water electrolyte solution into and out of the battery or cell, and also maintain close proximity between anode and cathode electrodes for minimized internal electrical losses. Each cathode electrode has an inner, tightly-compressed, relatively coarse or heavy metal fiber, wool filling or core material that is held tightly in position by a perforated metal plate, grating or gridlike expanded metal enclosure. Opposed wide side walls of the enclosure tightly clamp the core material in position therewithin. The fibers of the core material are preferably metallically or molecularly heat-bonded to minimize electrical contact resistance losses and to maximize the effective available cathode surface area. Additionally, each cathode for the most efficient operation, is provided with an endwise, as distinguished from a sidewise-opposed or surface presenting relation with respect to the anode electrode means, to enhance electrolyte circulation, maximize effective cathode surface area, and to facilitate electron movement between anode and cathode surfaces. For a substantially uniform supply of power throughout an extended useful life of the battery, the anode material may have portions of its metal surfaces masked or protected from galvanic action by a suitable non-conducting material, such as a resin. An arrangement of the masked surface portions may be affected such that they will be progressively or gradually sluffed-off, removed or displaced as the exposed metal anode surface portions are eroded in the operation of the battery.

Other cathode materials such as copper, lead, etc., were found to have an inferior performance in a polarized stagnant water situation. It was also discovered that the packing of the core material is an important factor in that a loosely packed core will waste nearly half its power in electrical resistance losses. The use of relatively thin layers of metal wool or scrap material sandwiched tightly or heat bonded between a semi-rigid expanded metal closure or grid has enabled a substantial reduction of such power losses.

The present state of the art has identified a magnesium and fine steel wool combination as attractive sea water cell constituents, however, the implementation of this to a high performance sea water battery has not been sufficiently successful to create a marketable device. For example, a 78 pound cell representing the best efforts of one organization, yielded 0.18 electrical watts of output. Through innovations described in this disclosure, however, ten times that much power can be derived from an equal weight battery. The teachings of this invention are therefore an extremely valuable contribution to the successful production of sea water batteries, and will sufficiently enhance the capability to compete successfully in size, weight, cost and reliability with other forms of long-life oceanographic power supply systems.

Cast or solid metal, magnesium anodes or polygonal cross-section approaching a square section have been shown in illustrated embodiments of the invention, but may also be of circular section. Several forms of cathode electrode bodies are shown which, in all instances, are utilized as a spaced group disposed in a cooperating spaced relation about or along, usually centrally disposed, metal anode electrode means of solid wall construction that provides the other electrode means for the battery. It is important to utilize steel, iron or nickel fiber, filament-like wool or scrap shavings of a minimum size of No. 3 as a core or filler material for each cathode and to tightly compress such material in a perforated, open-mesh, grid-like iron or steel plate or relatively stiff expanded metal member enclosure. Such a cathode element has a good resistance to polarization and assures a high surface to volume proportioning or ratio. It provides an implementation of a high performance sea water battery that is a marketable device. A battery of the invention eliminates the limiting or disadvantageous factors such as power loss in the metal fiber or wool material of the cathode bodies, poor circulation of sea water in and around the cathode and anode areas with a resistant clogging and ultimate degradation of battery performance, a short cell life due to rapid corrosion of the magnesium anode, and a poor utilization efficiency of the anode, particularly from the standpoint of low power, long life applications.

The use of coarse metal fiber material rather than finer material is important and in a particularly minimum of at least about No. 3 grade. A good range of nickel, steel or iron wool fiber or shaving size is from No. 3 coarse up through Nos. 4, 5, and 6; the material can be obtained from American Steelwool Mfg. Company of Long Island, N.Y. As distinguished from finer steel or iron material, it allows the sea water to circulate freely in and around the fibers and reduce the propensity of it to act as a filter and eventually clog and degrade it due to an accumulation of foreign material extracted from the water. In the absence of metallurgical bonding of the metal fibers as heretofore indicated, contact pressure exerted by the enclosing plate or grid panel material upon the steel wool or scrap core of each cathode is a critical factor from the standpoint of avoiding excessive electrical losses. It is assured by applying positive pressure to the opposite wide sides of the cathode body and then securing the cooperating or overlapping edges of the material as by bolt and nut assemblies, weld metal, clamping rings, etc.

Further improvement is attained by heating each electrode cathode package or assembly to just below its melting point for a short period of time, to metallurgically bond the metal fibers of the filler material together and provide a metallurgical bond between them and the perforated or expanded metal enclosing or panel members. Such an operation may be effected at a temperature of about 2000° to below 2400° F. In addition to providing an efficient electrical connection between the fibers and the metal enclosure member structure, this also avoids the problem of relaxation of contact pressure during the operating life of the cell. In fact, it minimizes the requirement for a high contact pressure within the core or filler of the cathode panel, without a densely matted finer mesh that tends to inhibit desirable circulation of water around or through the fibers.

Since the anode of such a battery is connected to the cathode through an external load, the iron or steel parts are maintained at electrical potential that precludes oxidation, rusting or corrosion thereof. Although cathodes have been disposed with their wide sides as distinguished from their edges or narrow ends about an anode, it has been discovered that the longer life results are not attained by such an arrangement, even although it does present surfaces that are parallel with opposed peripheral surfaces of the anode and in this sense reduce electrical losses through the electrolyte. It may be used, particularly where the environment is substantially sediment free, but in a normal depthwise-inserted sea water installation, it results in some degradation of the cathode-anode efficiency, particularly where the cell is to operate over a considerable period of time.

Surprising as it may seem, it has been determined that the most efficient operative arrangement involves not only the use of a group of spaced-apart cathode element assemblies or bodies disposed in a cooperating edgewise opposed and spaced relation with at least one anode element, but also involves the utilization of pillow-like or flattened ellipsoidal shaped cathode bodies or panels that, in effect, have a radially-outwardly extending mounted relation with respect to the anode means, whereby the forward edges, ends or narrow sides of the cathode bodies are in an electrolytically cooperating, efficient relation with the surfaces of the anode means. This configuration allows free circulation of and flushing by the salt water, and minimizes so-called filtering action of the fibers in the cathode bodies.

Another important result of this cathode arrangement is the reduction in the effects caused by erosion of the anode and changes in the electrical resistance across an electrolyte path, as the spacing increases with the age of the cell. A flat or annular cathode surrounding the anode means in the prior art, results in a drastic change in this spacing over the life of the cell. On the other hand, an edgewise or radial positioning results in improved utilization of both wide sides of the cathode bodies or panels from their forward edges before electron movement to the outermost or back face thereof or by way of a tortuous path through the layers of the steel wool. There is not only a significant saving in weight but improved performance attained by the disclosed construction.

The reaction of the magnesium anode with the sea water results in a substantially uniform recession of the anode surface areas over a period of time of the life of the cell, essentially independently of the amount of power that is extracted therefrom. Such a cell operates to generate power irrespective of whether or not power is being consumed by an external load. The general requirement of an oceanographic power source is that it will function at a low power rate for a long period of time of greater than one year's duration. It is thus important that the anode be consumed gradually to extend the useful life of the cell as much as possible. This may be further assured by masking exposed metal surface or face portions of the anode means to initially reduce the exposed surface area, and to progressively provide an effective larger erosion area or exposed metal as the cell is used and that is greater than would normally be available after use from a conventional fully exposed anode.

Masking may be accomplished by painting, spraying or applying a suitable insulating type of resin, such as polyvinyl chloride, an epoxy or a silicone to the surface areas that are to be protected or masked. It enables an eroding of the material from the exposed areas into the protected areas from side edges thereof by reaction under the masking material. This results in a sluffing-off of the masking material and a progressive increase in the effective exposed metal area of the anode. Where relatively low power and a relatively long life is required, a pancake shape of anode, see FIG. 5, may be employed that need not be of solid material; its center portion may be hollow, since such portion will have no useful function from the standpoint of providing eroding metal. That is, this portion of the anode is essentially parasitic from the standpoint that cell degradation will have progressed to an unacceptable or impractical low value, if the anode should corrode in utilization beyond this minimal diameter.

The protective matting or coating, as distinguished from a thin resin coating or tape wrapping, may be composed of a wood fiber material sprayed thereon or an insulating metal oxide material. Any suitable material can be used in this connection and applied as a coating portion $b$ to surface areas of the anode and whose slow rate of decomposition or removal may be somewhat accurately calculated. The principle, irrespective of how it is practiced, involves gradually or progressively opening new surface areas as the corrosion or erosion of the anode material progresses. A cell having a masked pattern along its periphery vertically thereof such as to provide a 20% exposed surface area and an 80% resin covered area when immersed in a salt water containing tank, has been found to provide a stabilized power output of about 1.3 watts at 0.3 volt. By thus reducing the anode area by a factor of 5, the power output was found to be reduced only by a factor of 2.3, as compared to an unmasked cell that produced a stabilized wattage of about 3.4 watts at 0.3 volt after 6 hours. The life of the cell was thus increased to well over a year from about six months in a battery weighing approximately 80 lbs. and having an anode weighing about 40 lbs., as utilized in a tank containing a 5% solution of sodium chloride.

The cells may be connected in parallel or in series for increased voltage requirements, when utilized with an isolating converter for converting a small DC output voltage to a larger output voltage or for converting DC to AC. For example, an 0.3 volt cell output may be converted to a 12 to 500 volt level at a conversion efficiency of greater than 75% and at minimized cost.

In the embodiment of the invention illustrated in FIGS. 1 and 2, anode electrode means A is shown disposed centrally as a supporting base for a group of cathode electrode bodies B. As shown, the cathode bodies B are disposed in a radial or spoke-like configurated arrangement about the anode A, as supported and suspended by means of transversely-outwardly or radially-extending, upper and lower sets of wing-like tabs or fingers 16 and 19, respectively. The upper set of fingers 16 is shown secured, as by welding, to an upper, cylindrical, metal mounting member or collar 15. The collar 15 is, in effect, integrally-secured and positioned on the upper end of the anode means A through the agency of an insulating resin material 35 which may be poured through the upper end of the collar and permitted to solidify adherently in place against the upper end of the anode and about its upwardly-projecting integral connector tab 10. Any suitable type of electrical device, such as a small transformer of DC/DC converter 40, may also be enclosed within the collar 15 and may be electrically-energized by input leads 40a and 40b that are respectively connected to screw terminals or binding posts 10a and 16b.

By way of representative illustration, converter 40 is shown provided with output leads that are connected to input terminals 30a and 30b of a suitable piece of underwater electric equipment, such as an acoustic pinger or other electric energy consuming unit. A circular closure cap or head 27 is shown removably-fitted within the upper open end of the collar 15 and secured in place by set screws 28. The cap 27 may thus be used to support the unit 30 whose flanged bottom portion may be removably-secured thereto by set screws or nut and bolt assemblies 31.

In the embodiment of FIGS. 1 and 2, each transverse or radial finger 16 and 19 is shown provided with an elongated slot 16a or 19a to facilitate adjustment of the operating spacing between inner end, narrow side or edge portions of the cathode bodies B with respect to the anode means A. Nut and bolt assemblies 25, as particularly illustrated in FIG. 2, extend through each electrode cathode body B and not only serve to mount an associated cathode body on a pair of upper and lower fingers 16 and 19, but also to tightly press or clamp fiberlike metal core material 11 between, for example, opposed wide side walls 12a and 12b of each perforated metal enclosure. In FIGS. 1 and 2, three peripherally spaced-apart leg or upright support members 26 are shown secured to an associated cathode body B and on a pair of fingers 16, 19 by the bolt and nut assemblies 25. Each leg member 26 has an upwardly-extending connector tab portion 26a and a downwardly-extending tab portion 26b that, if desired, may be employed to suspend the cell or mount batteries or cells on each other, see the dot and dash lines indicating an upper cell. Also, the lower tab ends 26b, as shown in FIG. 1, may serve as positioning feet for an individual battery.

FIG. 2 illustrates one form of cathode body or assembly B in which two perforated or expanded metal members 12a and 12b are secured together at their adjacent, crimped, narrow side or end portions, as by means of weld metal $w$. In the cathode body construction $B_1$ of FIG. 6, one pice of perforated metal material 12 is shown overlapped at its adjacent ends and secured, as by weld metal $w$. FIG. 6A illustrates another form of cathode $B_2$ whose metal enclosure 12 has its edge portion 12c folded-over another or an adjacent portion and clamped in place. FIGS. 6B and 6C show the use of an expanded metal member 12 having a turned-in flange edges or portions 12d.

In FIGS. 9 to 13, inclusive, $a$ represents an exposed metal surface portion, and in FIGS. 9 to 12, inclusive, $b$ represents a protective covering, masking insulating surface portion or coating. In FIG. 13, $c$ represents a stepped type of coating or masking. The portions $b$ and $c$ may be applied in the form of a tape or applied in liquid form like a paint. The coating may be applied in such a manner as to facilitate the release of the hydrogen gas that is generated on the anode. As the electrolyte erosion progresses during the use of a battery, it tends to gradually undermine the covered adjacent surface portion $b$. As the portions $a$ are eroded or eaten-away, this tends to expose thickness edge portions of the metal that lie along the masking or covering material $b$ to progressively remove the under-support for the masking material $b$, and thus increase the metal surface portions that are exposed.

The masking material can be made to break away or sluff-off in a progressive manner. Such a type of action thus tends to increase the area of metal available for electrolytic action proportionately to the lengthening of the distance between the exposed metal of the anode and of the cathode bodies to maintain the power produced by the cell or battery substantially constant throughout its active life. Thus, in effect, the active life of a cell may be further increased beyond the minimum required period.

In FIGS. 4 and 5, a somewhat flat, relatively larger type of anode $A_2$ is illustrated of pancake-like shape and as having its upper end surface covered with a protective resin matt or coating portion $b$. This type of anode, like other anodes shown, may be a solid metal casting, but is provided with a hollow center bore $d$, since its metal body will lose an effective electrolytic operating distance with respect to cooperating cathode bodies before the eroding action reaches the central portion of the anode. This type of anode as used in a cell will produce a relatively lower energy supply for a relatively longer period of time than a more elongated anode of lesser diameter or cross-section, such as A of FIGS. 1 and 2 or $A_3$ of FIGS. 7 and 8. The anode $A_2$ is shown supported on a metal bottom cup 17 that is insulated therefrom by a resin inner layer 18, similarly to the lower end portion of the embodiment of FIG. 1. Only a lower set of fingers or tabs 19 for supporting a group of electrode bodies B are shown provided. An electrical lead or terminal 41 may be brazed or welded to the body of the anode $A_2$ to provide one terminal of the battery, while the other electrical terminal may be provided by the metal supporting cup 17 or one of the fingers 19.

In the embodiment of FIGS. 7 and 8, the construction is somewhat similar to that of FIGS. 1 and 2, however, anode $A_3$ is shown provided with a lower or downwardly-projecting connector lug 10' in addition to its upper connector lug 10, and the connector lugs 10 and 10' are provided with an associated binding post or connector screw terminal 48 and 58. Upper metal collar 45, like the metal collar 35 of the embodiment of FIG. 1, is mounted in position at the upper end of the anode $A_3$ by a suitable insulating metal, such as solidified resin 47. The lower end of the anode $A_3$ has a solidified resin insert 57 which positions the lower end of the anode $A_3$ in metal collar 55. Electric leads may thus be taken from both ends of the battery, with the anode leads being represented by the binding posts 48 and 58 and the cathode leads being taken from the binding posts or terminals 46b and 56b.

Upper and lower transversely-extending wings or fingers 46, 46' and 56, 56' extend respectively from the collars 45 and 55 for mounting cathode assemblies $B_3$ to extend vertically-endwise towards the anode $A_3$. Bolt and nut assemblies 25 are used in a similar manner to the embodiment of FIGS. 1 and 2. The cathode bodies $B_3$ which carry vertical legs 26 are shown provided with supporting upper and lower fingers 46 and 57 of thickened or widened extent to reinforce their mounting on the respective collars 45 and 55. As shown in FIG. 7, the legs 26 may be spaced in somewhat of a quadrant arrangement about the anode $A_3$.

FIGS. 9 to 13, inclusive, illustrate somewhat diagrammatically various cooperating arrangements of cathode electrode body and anode utilizations. In FIG. 9, anodes $A_4$ are positioned in an opposed, outer, aligned relation with respect to an inner line or group of cathode bodies $B_3$. Also, the narrower side of each anode $A_4$, face narrower sides or the edges of adjacent cathodes $B_3$. This figure also illustrates a utilization of insulating material $b$ which, as shown leaves only an exposed metal front face or surface portion $a$, with the other three surfaces being masked.

In FIG. 10, two outer groups or lines of cathodes $B_3$ are utilized with a centrally-disposed group or line of anodes $A_5$. Each anode is shown partially covered by an angular masking insulation portion $b$ to leave opposed corner areas of each anode $A_5$ that face the opposed lines of cathodes $B_3$ exposed, as indicated as by surface portions $a$. In FIG. 11, anode $A_6$ is shown covered with protective material $b$ along one longitudinal side thereof and, at its ends, to leave an exposed side $a$ that faces a vertically-aligned group of cathodes $B_3$.

In the embodiment of FIG. 12, two outer groups or longitudinal lines or rows of cathodes $B_3$ are shown positioned along opposite vertical sides of a longitudinally-extending solid metal anode body $A_7$, whose opposite metal side portions $a$ are exposed, and whose opposite end portions are masked or covered, as indicated by $b$. In the embodiment of FIG. 13, anode $A_8$ is shown provided with a stepped, layered type of masking or covering $c$ which may be a single layer adjacent an end thereof whose adjacent end surface portions $a$ are exposed. The covering or masking material $c$ may be applied in the form of staggered painted-on resin layers or of tape layers, as desired. In this figure, a pair of longitudinally-extending cathodes $B_4$ are somewhat diagrammatically shown, and in a substantially parallel or side-facing relation with the anode $A_8$. However, endwise-facing cathodes may also be employed with the anode $A_8$ instead of the parallel cathodes $B_4$.

I have found that commercially available electrically conductive epoxy resins may be used for bonding the fibers or wool-like material together and to the metal outer retaining or enclosing member. Like metallurgical bonding, this type of bonding also minimizes the need for compacting the core material and enables the utilization of a relatively more porous structure. Also, screen material such as iron screening may be used in providing cathode bodies; it may be employed in layers having a staggered relation from the standpoint of its mesh. The cathode of the disclosure is of relatively flat shape, has a main body portion of relatively flexible, permeable or porous metal construction, and has a relatively rigid perforated metal supporting structure which are in an efficient electrically conductive or connected relation with each other.

I claim:

1. In a galvanic battery for immersion in a salt water electrolytic solution, metal anode electrode means, a group of relatively flat-shaped cathode electrode bodies in a spaced-apart relation with respect to each other, means connected between said anode electrode means and said group of electrode bodies for securely mounting said group of electrode bodies in an insulated and wide face spaced relation with respect to each other and for mounting said bodies in an edgewise-facing relation with respect to said anode electrode means, and each of said cathode bodies having a central portion of fiber-like metal material secured within a perforated metal enclosure said metal fibers being in pressure contact with each other.

2. In a battery as defined in claim 1, each of said cathode bodies being of substantially ellipsoidal shape.

3. In a battery as defined in claim 2, said group of cathode bodies having a radially disposed spoke-like positioning about said anode means.

4. In a battery as defined in claim 1, said metal anode means having a solid wall facing said group of cathode bodies.

5. In a battery as defined in claim 1, said fiber-like metal material being metallurgically-bonded together and to said enclosure.

6. In a battery as defined in claim 1, said fiber-like metal material being a material selected from the group consisting of iron, steel and nickel fiber, filament-like metal wool and scrap shavings.

7. In a battery as defined in claim 1, said fiber-like metal material being a minimum of No. 3 size.

8. In a battery as defined in claim 1, said metal enclosure having a pillowlike shape with opposed wide side wall portions and a clamping bolt assembly extending centrally through said fiber-like material and opposite wide side wall portions of said enclosure.

9. In a battery as defined in claim 1, radial connecting means having support fingers extending transversely from said anode electrode means and carrying said group of cathode electrode bodies, and upright supporting leg members secured to said radial support fingers and extending along adjacent ones of said cathode bodies.

10. In a battery as defined in claim 1, connecting means having pairs of upper and lower support fingers extending radially-outwardly from and in an insulated relation with respect to said anode electrode means and having endwise-extending slotted portions adjacent their outer ends, and nut and bolt assemblies extending through each of said slotted portions and through an adjacent cathode electrode body for mounting said body in an adjustably-spaced relation with respect to said anode electrode means.

11. In a battery as defined in claim 1, said anode electrode means having surface portions of its body that lie adjacent actively exposed portions thereof masked by a coating of insulating material thereon for at least initially restricting the surface area of metal exposed to the electrolyte.

12. In a battery as defined in claim 11, said anode means comprising a group of anodes disposed in a cooperating spaced relation along said cathode bodies, and each of said anodes having at least one surface portion facing towards said cathode bodies that is exposed with respect thereto and having another surface portion that is more remote in spacing with respect to said cathode bodies covered with said coating.

13. In a battery as defined in claim 11, a stepped group of protective resin layers extending from one end of said anode means therealong towards the opposite ends thereof and being spaced from the opposite end thereof to define an exposed metal surface portion adjacent the opposite end of said anode means, and said layers being staggered in increasing number from the exposed portion of the opposite end of said anode means towards the one end thereof.

14. In a battery as defined in claim 1, each said cathode body comprising a wool-like metal core material in a pressure-packed relationship within said metal enclosure, said core material having a size within a range of about No. 3 to No. 6, inclusive, said connecting means having vertically spaced-apart mounting fingers secured in an insulated relation to said anode means and projecting transversely-outwardly therefrom, and each of said cathode bodies being securely mounted on an associated group of said fingers with one narrow edge portion thereof facing towards said anode means.

15. In a battery as defined in claim 14, said metal enclosure being of expanded steel construction, said core material being a wool-like metal selected from the group consisting of iron, steel and nickel, and said anode electrode means being of magnesium metal.

16. In a battery as defined in claim 1, said anode means being of substantially pancake shape and having a hollow central portion representing an area that is nonreacted during normal usage of the battery under an electric current consuming load.

17. In a galvanic battery for immersion in a salt water electrolytic solution, metal anode electrode means, a group of relatively flat-shaped upright cathode electrode bodies having their wide faces in an opposed spaced-apart relation with respect to each other, said group of cathode electrode bodies being positioned in an edgewise-facing and spaced-apart relation with respect to said anode electrode means, support fingers extending transversely between said anode electrode means and the cathode electrode bodies and carrying said group of cathode electrode bodies in the defined relations with respect to each other and with respect to said anode electrode means, and said fingers having means electrically insulating said cathode electrode bodies and said anode means with respect to each other and each of said cathode bodies having a central portion of fiber-like metal material secured within a perforated metal enclosure, said metal fibers being in pressure contact with each other.

18. In a battery as defined in claim 17, said electrically insulating means being resin material mounted about opposite end portions of said anode electrode means, and said support fingers being mounted on said insulating means.

19. In a battery as defined in claim 17, an insulating coating applied as a masking coating to surface portions of said anode electrode means that extend from positions thereon that are immediately adjacent to surface portions having the closest spacing with respect to said group of cathode bodies, whereby additional surface portions of said anode electrode means will be exopsed to electrolytic action with respect to said group of cathode bodies progressively due to erosion of active surface portions of anode electrode means during the life of the battery.

References Cited
UNITED STATES PATENTS

| | | | |
|---|---|---|---|
| 312,487 | 2/1885 | McGinnis | 136—100 R |
| 2,234,732 | 3/1941 | Haunz | 136—74 |
| 2,669,597 | 2/1954 | Ruben | 136—100 R |
| 3,156,586 | 11/1964 | Solomon et al. | 136—100 R |
| 3,235,408 | 2/1966 | Harris | 136—100 R |
| 3,401,063 | 9/1968 | Optiz | 136—100 R |
| 3,427,201 | 2/1969 | Burant et al. | 136—100 R |
| 3,472,699 | 10/1969 | Jackley et al. | 136—100 R |
| 3,497,393 | 2/1970 | Dreisbach et al. | 136—100 R |

WINSTON A. DOUGLAS, Primary Examiner

C. F. LEFEVOUR, Assistant Examiner